(12) United States Patent
Robison et al.

(10) Patent No.: US 8,812,857 B1
(45) Date of Patent: Aug. 19, 2014

(54) SMART CARD RENEWAL

(71) Applicant: Dell Products, LP, Round Rock, TX (US)

(72) Inventors: Charles D. Robison, Round Rock, TX (US); Daniel L. Hamlin, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/772,625

(22) Filed: Feb. 21, 2013

(51) Int. Cl.
*G06F 21/00* (2013.01)
*H04L 9/32* (2006.01)

(52) U.S. Cl.
CPC .................................... *H04L 9/3268* (2013.01)
USPC ............... 713/176; 713/182; 713/155; 726/1; 726/2

(58) Field of Classification Search
None
See application file for complete search history.

(56) References Cited

U.S. PATENT DOCUMENTS

| | | | |
|---|---|---|---|
| 7,484,089 B1 * | 1/2009 | Kogen et al. ................... | 713/156 |
| 8,683,196 B2 * | 3/2014 | Fu et al. ........................ | 713/156 |
| 2006/0048222 A1 | 3/2006 | O'Connor et al. | |
| 2007/0235517 A1 | 10/2007 | O'Connor et al. | |
| 2008/0052526 A1 | 2/2008 | Dailey et al. | |
| 2009/0126001 A1 * | 5/2009 | Krantz et al. .................... | 726/10 |
| 2009/0198618 A1 * | 8/2009 | Chan et al. ....................... | 705/66 |
| 2010/0202617 A1 | 8/2010 | Balakrishnan et al. | |

FOREIGN PATENT DOCUMENTS

IN  0235/DEL/09 A1  2/2009

OTHER PUBLICATIONS

"The Secure Access Using Smart Cards Planning Guide, Version 1.1," Microsoft, Jun. 2005, microsoft.com/technet/SolutionAccelerators.

* cited by examiner

*Primary Examiner* — Andrew Nalven
*Assistant Examiner* — Mary Li
(74) *Attorney, Agent, or Firm* — Larson Newman, LLP

(57) ABSTRACT

A method includes storing creating a smart card with an expiration date and renewing the smart card after the expiration date. The smart card may be created with data stored upon the smart card for use in the renewal process. The data may comprise a certificate. The smart card may be issued at the information technology department of an organization and may be renewed at a user workstation of the organization. The renewal process may include a renewal environment for authenticating the holder of the smart card. The card holder may be required to provide a personal identification number in order to enter into the renewal environment. The rights conferred by the renewed smart card may be more limited than the rights conferred by the original smart card, both in duration and access to data within the organization.

20 Claims, 6 Drawing Sheets

SMART CARD RENEWAL

FIELD OF THE DISCLOSURE

This disclosure generally relates to information handling systems, and more particularly relates to smart card renewal.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system may utilize measures to protect the security of data, including the use of smart cards that hold public/private cryptographic key pairs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
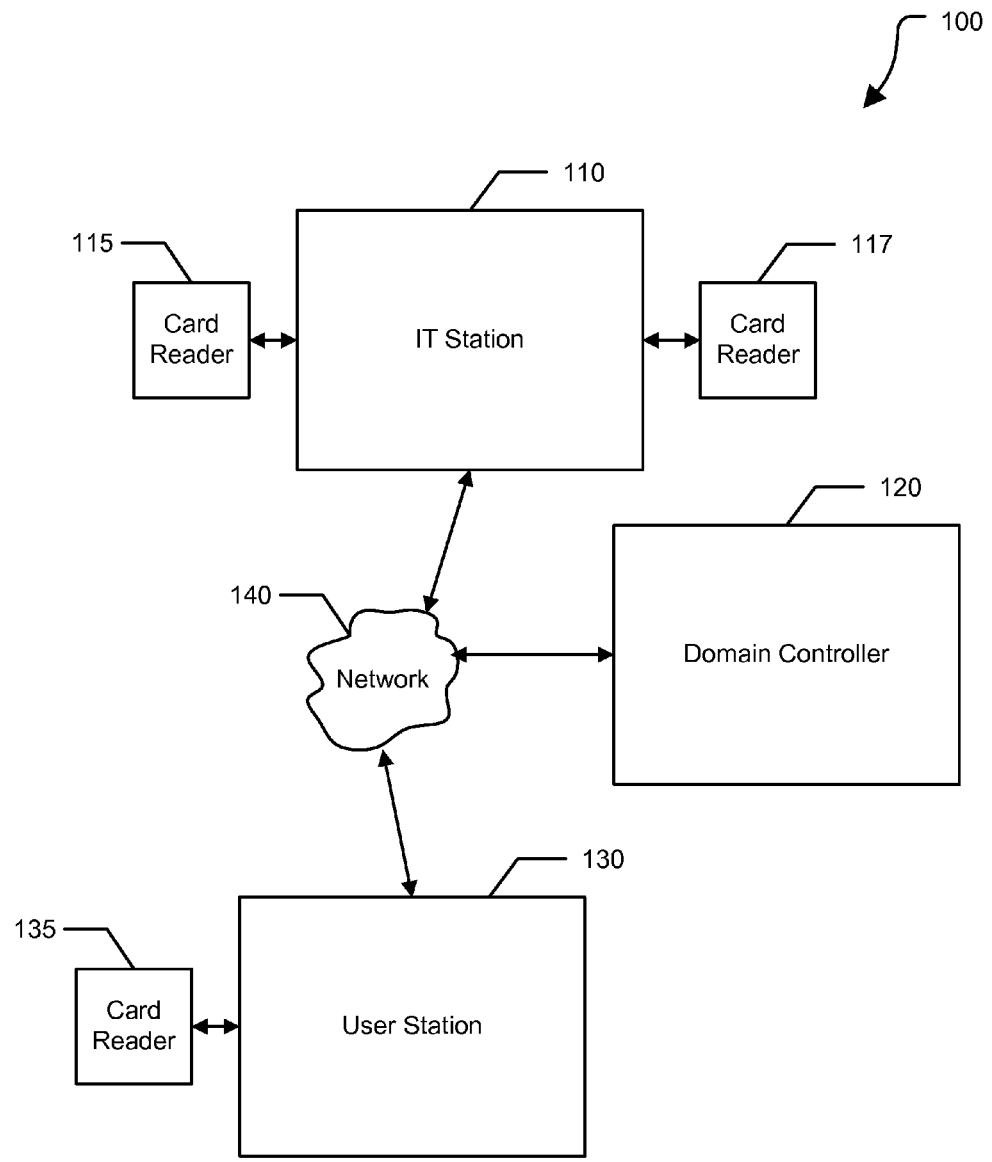
FIG. 1 is a block diagram of a system to use smart cards according to one embodiment of the disclosure.

FIG. 1 shows a system 100 for the use of smart cards that includes information technology (IT) station 110, domain controller 120, and user station 130 connected by network 140. Card readers 115 and 117 are connected to IT station 110, and card reader 135 is connected to user station 130.

IT station 110 may be an information handling system such as a desktop or laptop computer, domain controller 120 may be an information handling system such as a server, and user station 130 may be an information handling system such as a desktop or laptop. Card readers 115, 117, and 135 may read smart cards. In some embodiments, the cards are inserted in them. In other embodiments, they may communicate with the smart cards through radio frequency (RF) induction technology. When a smart card is placed within the vicinity of one of card readers 115, 117, and 135, the card may use an inductor to capture some of the incident radio-frequency interrogation signal, rectify it, and use it to power the card's electronics.

System 100 may enable the use of smart cards in a business or other organization. Smart cards may be credit card sized plastic items that store information used to maintain the security of data, such as private/public cryptographic key pairs and public key infrastructure (PKI) certificates. A user at user station 130 may be required to insert a smart card into card reader 135 as part of a log-in process. Data from the smart card may be sent over network 140 to domain controller 120 and there checked against a data base of security information. If the information in the card fails the check, the user may be prevented from gaining access to a computer system. In many embodiments, the log-in process may also require that the user provide a personal identification number (PIN).

In some embodiments, system 100 may be a portion of a PKI system. A PKI system may provide for the distribution and use of private/public cryptographic key pairs. Data encrypted with one key of the pair may be decrypted only by the other key of the pair. A holder of the private key may issue the public key. The holder is then uniquely able to decrypt information encrypted with the public key. Information may therefore be safely sent to the holder by encrypting it with the public key. To ensure the identity of the recipient of the information, a certificate authority (CA) may issue a certificate attesting to the identity of the holder of the private key. In these embodiments, the smart card used to log on may contain a private/public key cryptographic key pair and a certificate attesting to the identity of the holder of the private key. At log on, card reader 135 may read the certificate from the smart card and transmit it to domain controller 120. Domain controller may maintain a data base of valid certificates and may check that the certificate is contained in the data base. Domain controller 120 may also act as a certificate authority, issuing certificates when a new private/public key cryptographic key pair is created on a smart card.

Activation of a smart card may occur at IT station 110 pursuant to a policy of the issuing organization. Such a policy may provide additional security. A system administrator may log onto IT station 110 with an administrative smart card inserted in card reader 115. The administrator may then take information from a user and cause the activation of a smart card inserted in card reader 117. The activation may include sending a command to the smart card to generate a private/public key cryptographic key pair. Card reader 117 may read the public key and transmit it to IT station 110. IT station 110 may obtain a certificate attesting to the ownership of the public key and may write it to the smart card. In some embodiments, IT station 110 may transmit the public key to domain controller 120 and domain controller 120 may issue the certificate. The certificate may be written to the smart card by card reader 117.

The activated smart card may have an expiration date. System 100 may provide for a renewal of an expired smart card. When the card is activated, data in addition to the certificate and the private/public key cryptographic key pair may be written to the smart card. When the card is expired, that additional data may be read, placing the user in a card recovery environment. That environment may be a protected environment that permits only limited interaction with the computer system of the organization. In some embodiments, the sole purpose of the recovery environment may be to repopulate a certificate on the smart card. In that environment, the user may be asked to provide authentication data and the computer system may check that the user is eligible for a renewal smart card. Once the user is authenticated and found eligible, a new private/public key cryptographic key pair may be generated and an additional certificate attesting to the owner of the private key may be produced and written to the smart card. In some embodiments, the new key pair may be generated by the smart card itself, on command from system 100.

In some embodiments, use of the renewed smart card may be more limited than use of a newly issued smart card. The user may be permitted to log in only for limited purposes or the duration of the renewed card may be shorter than the duration of a newly-issued card. The user may, for example, have a lower security clearance to access confidential documents with the renewal card than with the original card or may be limited to routine functions but prevented from performing system administration functions.

In many embodiments, the user with an expired smart card may be required to enter a PIN in order to enter into recovery environment. The PIN enables the reading of the data on the smart card. In further embodiments, the recovery data is a certificate. In some embodiments, as a prerequisite to entering into recovery mode, a user may be required to attempt regular system entry. When the system determines that the card has expired, the user is then prompted for the recovery PIN.

In other embodiments, multiple networks may connect all of the information handling systems of an organization. In some embodiments, the role of domain controller may be combined with the role of administrator. In many embodiments, an organization's computer system may contain multiple user workstations, multiple IT stations, and multiple servers hosting a domain controller.

Figure 2:
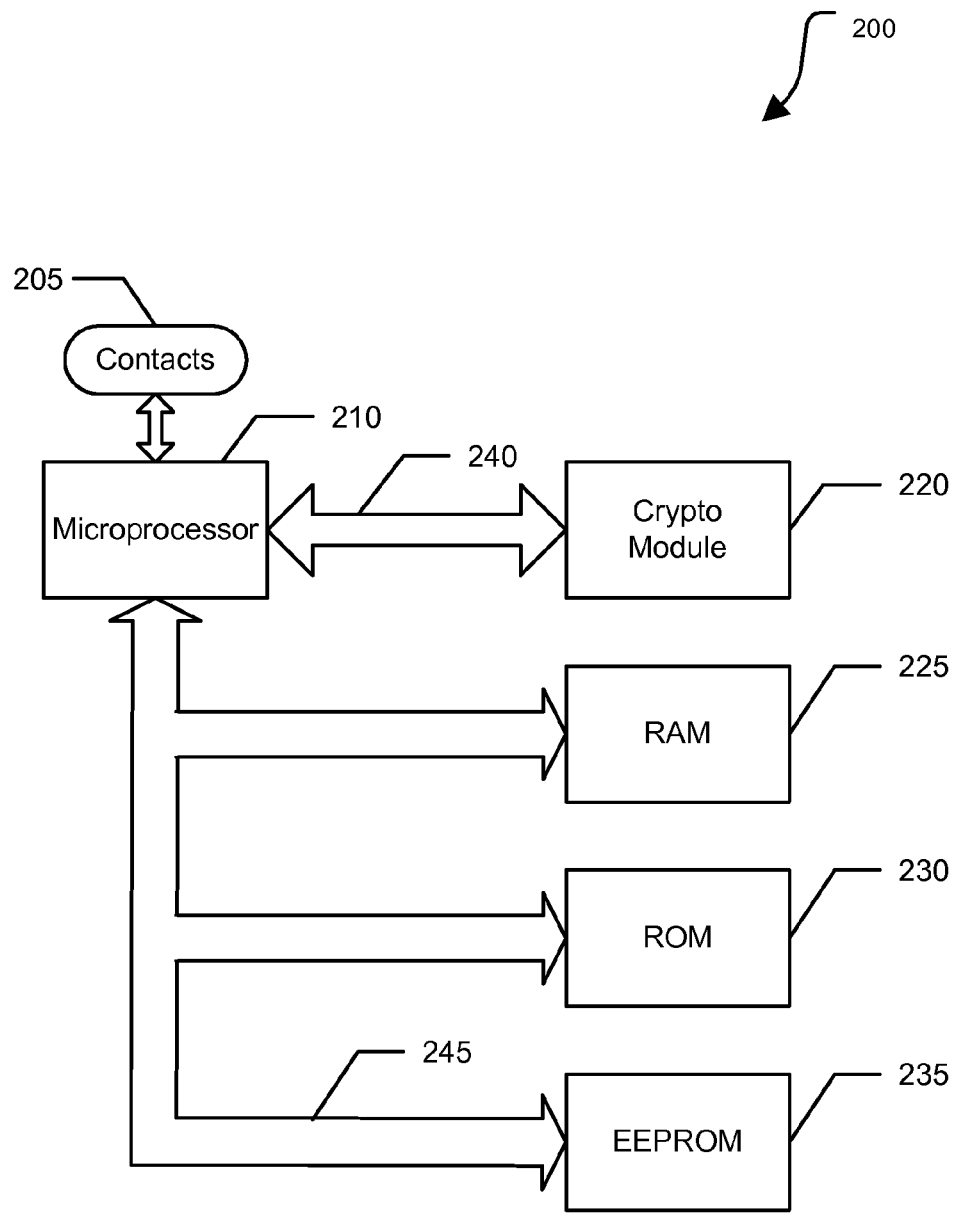
FIG. 2 is a block diagram of a smart card according to one embodiment of the disclosure.

FIG. 2 shows a smart card 200 that includes contacts 205, microprocessor 210, cryptography module 220, Random Access Memory (RAM) 225, Read Only Memory (ROM) 230, Electronically Erasable Programmable Read Only Memory (EEPROM) 235, and connections 240 and 245. Contacts 205 may provide electrical connectivity between a card reader and smart card 200 when it is inserted into the card reader. The reader may be used as a communications medium between smart card 200 and a host, such as a computer or a point of sale terminal, or a mobile telephone. In some embodiments, contacts 205 may consist of gold-plated contact pads.

Cryptographic module 220 may perform cryptographic functions such as encryption, decryption, and digital signatures. ROM 230 may contain the operating system of smart card 200. The operating system may manage the file system and run desired functions. EEPROM 235 may contain the file and directory structures of the file system, a PIN management applet, the private key of a private/public cryptographic key pair, an authentication certificate used for ordinary system access and a recovery certificate used to enter into a recovery environment when smart card 200 has expired. RAM 225 may be used to run desired functions of smart card 200 such as encryption and decryption. A portion of the memory of smart card 200 may be protected from tampering. In particular, the operating system may prevent smart card 200 from transmitting the value of the private key to a card reader.

In the embodiment of FIG. 2, communications between the card reader and smart card 200 all use microprocessor 210 as an intermediary. Microprocessor 210 communicates with cryptographic module 220 through connection 240, and with RAM 225, ROM 230, and EEPROM 235 through connection 245.

Smart card 200 may provide a renewal feature. When the authentication certificate has expired, the renewal certificate may be transmitted from EEPROM 235 to microprocessor 210 over connection 245, and read by a card reader through contacts 205. A PKI system which reads the renewal certificate may enable a card holder to enter into a recovery environment. In the environment, smart card 200 may generate a renewal private/public cryptographic key pair and store the private key in EEPROM 235. The PKI system may generate a replacement certificate to attest to the identity of the holder of the public key, and smart card 200 may store the replacement certificate in a protected portion of EEPROM 235.

In many embodiments, the renewal process may be less rigorous than the original issuance process. The renewal may occur at the card holder's work station, while the issuance may occur at a more secure environment, such as a corporate IT department. In addition, the card holder may furnish credentials during issuance which are not required for renewal, such as governmental identification or identification from the issuing organization. Further, the card holder may furnish more information during the original process, such as personal information.

In other embodiments, a smart card may be contactless. Instead of being read by insertion in a card reader, it may communicate through wireless technology, such as radio frequency (RF) induction technology. In other embodiments, a smart card may omit a cryptographic module, may allow for communication between memory and contacts that does not use the microprocessor as an intermediary, may have a different memory organization, or may utilize a different communications pathway. In some embodiments, a smart card is a memory card and does not contain a microprocessor. In many embodiments, data other than a certificate may be stored on a smart card to enable renewal of the smart card. In a few embodiments, a smart card may be renewed without the use of any renewal-specific data contained on the smart card.

Figure 3:
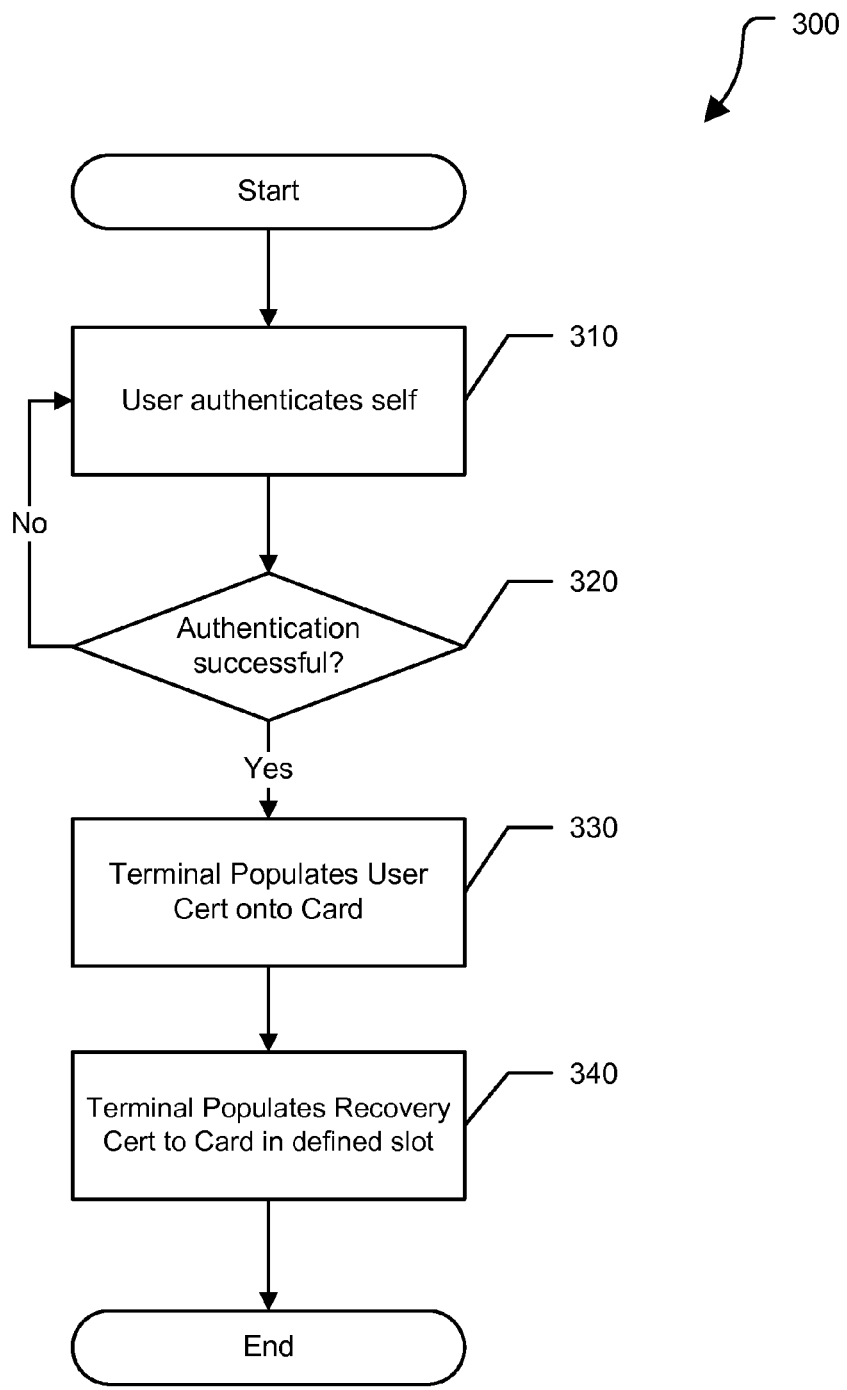
FIG. 3 is a flow diagram illustrating a method of creating a smart card according to one embodiment of the disclosure.

FIG. 3 is flow diagram 300 of a method that begins at block 310 with authentication of an individual to be issued a smart card (a card holder) by a credential provider of an organization, such as the administrator at IT station 110 of FIG. 1. The credential provider may, for example, examine public identification provided by the card holder, such as a driver's license, or identification provided by the organization, or a combination of both. If, at block 320, the authentication is not successful, the credential provider may request that the card holder try again. The card holder, for example, may have provided an incorrect password or provided an out of date identification card. In other embodiments, however, the method may end after a certain number of failed attempts at authentication.

If authentication is successful, flow proceeds to block 330. A terminal with a smart card reader, such as IT station 110 of FIG. 1, populates a user certificate onto a smart card; that is, writes the user certificate onto the card. The certificate may attest that the card holder is the holder of a private/public cryptographic key pair through the card holder's possession of the smart card. The private/public cryptographic key pair may have been generated on the smart card in response to a command to the smart card from the terminal. The system may store the certificate in a data base of certificates and check the certificate against the data base when the card holder logs onto the organization's computing system. The certificate may be associated with a PIN or other card holder identification. The smart card may not be released for card holder login until the card holder enters the PIN or other identification into the system. The combination of the PIN or other card holder identification and the certificate contained on the smart card may enable the card holder to log on to the system.

At block 340, the terminal populates a recovery certificate onto the card in a defined slot. The recovery certificate may, for example, be stored in a specific location of the smart card's EEPROM. Release of the recovery certificate from the card may be restricted until the card has expired. During login, for example, a computing device may read a different slot of the smart card to find a certificate for use in the login. Unlike the user certificate, the recovery certificate may not be associated with a private/public cryptographic key pair. It may, for example, identify the card holder. The process of populating the recovery certificate may be similar to the process of populating the user certificate onto the smart card. Again, the recovery certificate may be stored in a data base for checking when a card holder attempts to enter recovery mode for the smart card. The smart card may now be issued to the card holder and ready for use.

In other embodiments, other data may be stored on a smart card to enable a recovery environment in which the card may be renewed. The smart card may, for example, contain a PIN or password that is used to enter the recovery environment. In some embodiments, the replacement certificate and the replacement private/public cryptographic key pair may be included in the smart card at generation. In the recovery environment, this data may be provided to a domain controller and included in a PKI system data base. In a few embodiments, the insertion of an expired smart card may automatically bring up a recovery environment. The card holder may be authenticated and a recovery private/public cryptographic key pair and certificate may be generated.

Figure 4:
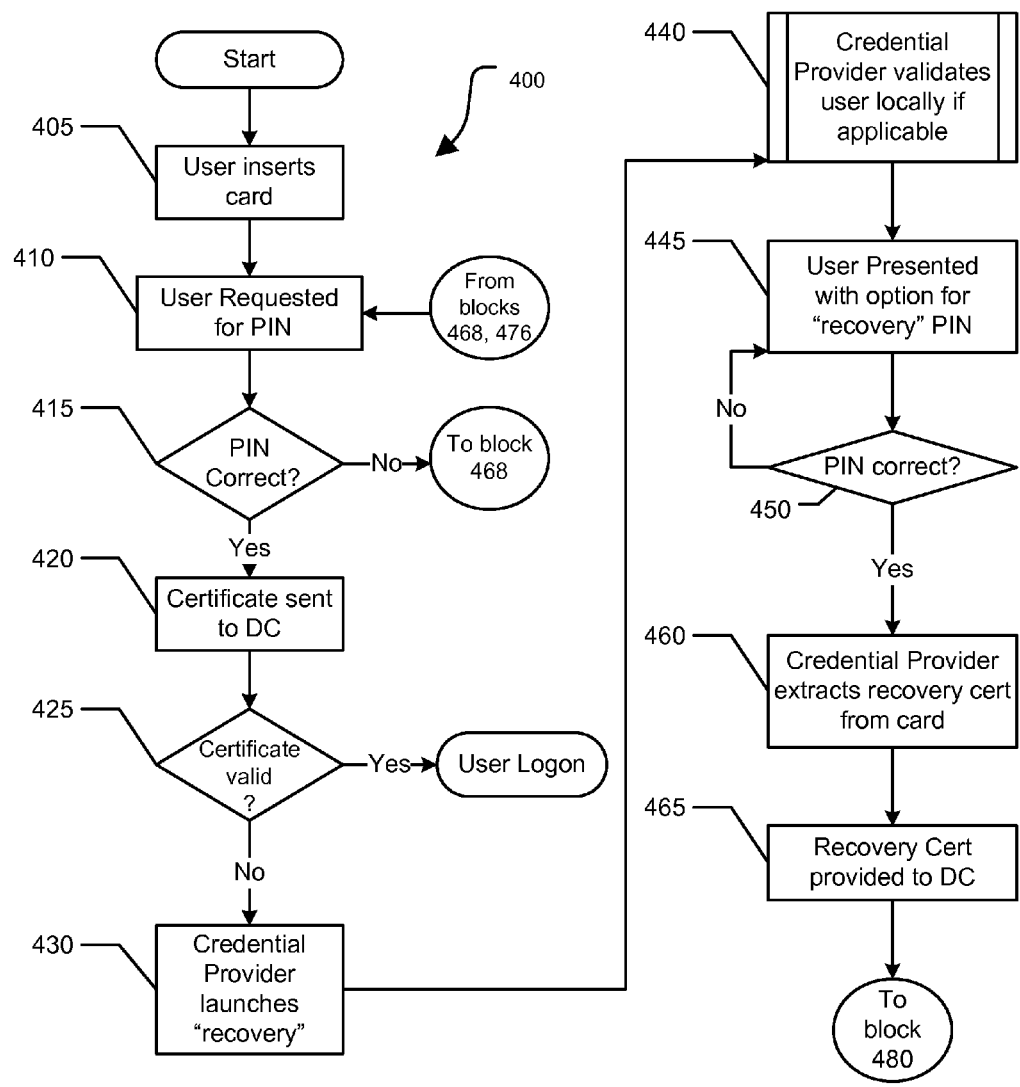
FIG. 4 is a flow diagram illustrating a method of generating a replacement certificate on a smart card according to one embodiment of the disclosure.
Figure 4:
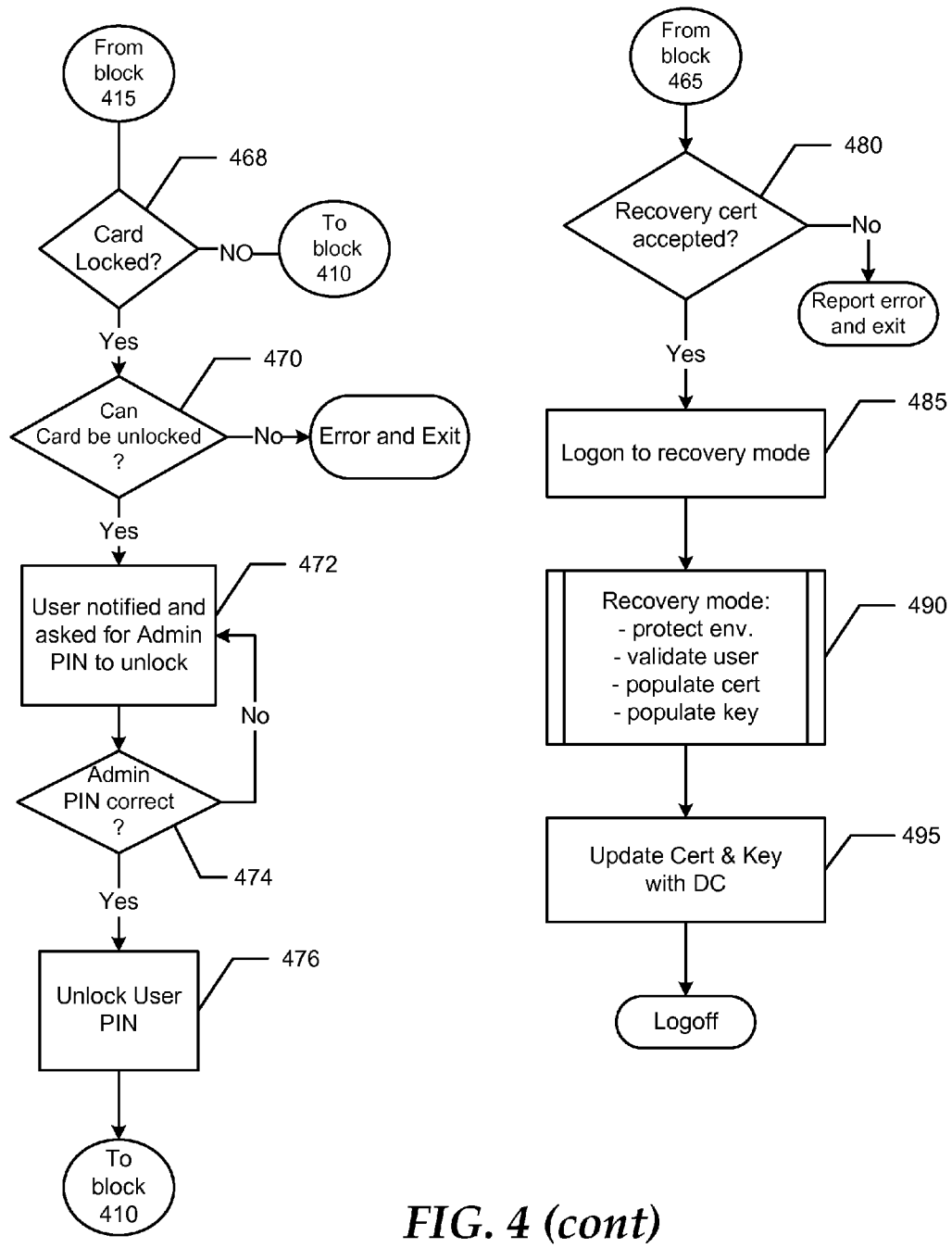

FIG. 4 is a flow diagram 400 of a method that begins at block 405 with a card holder inserting a smart card into a card reader. The card holder may insert the card in a card reader connected to the card holder's workstation, such as card reader 135 and user station 130 of FIG. 1. At block 410, the card holder is requested for a PIN. At block 415, the PIN is checked. If it fails, flow proceeds to block 468.

If the check of the PIN succeeds, at block 420 a certificate on the smart card is read and sent to a domain controller such as domain controller 120 of FIG. 1. The domain controller tests the validity of the certificate, such as by searching for the certificate in a data base of certificates, at block 425. If the certificate is valid and has not expired, the card holder may logon and the method may end.

If the certificate is not valid, it may have expired or been revoked. At block 430, the credential provider, such as the organization issuing the smart card, launches into recovery mode. In some embodiments, the credential provider may also provide appropriate user messaging indicating that the card holder is not allowed to log on. At block 440, the credential provider may validate the card holder locally; that is, at the site where the card holder attempted to log in. The credential provider may, for example, request an on-site manager to verify the identity of the card holder. At block 445, the credential provider requests a recovery PIN from the card holder. The PIN is checked at block 450. If the PIN is not correct, the card holder is given additional chances to present a correct PIN. If the card holder fails, the method may end.

Once a correct PIN is presented to the credential provider, a recovery certificate is extracted from the smart card at block 460. The recovery certificate may, for example, be read from a defined slot of EEPROM of the smart card. The recovery certificate is presented to the domain controller at block 465. At block 480, the recovery certificate is checked. If it is not accepted, the domain controller may report error and the method may end. Otherwise, the domain controller links the recovery certificate to the user and logs the user onto certificate recovery mode at block 485. The recovery mode may be a secure environment in which the domain controller authenticates the card holder and updates entries to the card holder's smart card, but which does not allow the card holder to engage in other activities on an organization's computer system.

In recovery mode at block 490, the system may validate the authority of the card holder to obtain a renewed smart card and may populate the smart card with a new private/public cryptographic key pair, a new certificate attesting to ownership of the private key, and any PIN associated with the new certificate. The certificate and public key are updated by the domain controller, such as by inclusion in a data base of certificates and public keys, at block 495.

At block 468, if the card holder's pin was not accepted, a check is made whether the smart card is locked so as not to accept a PIN. If not, flow returns to block 410. If so, a check is made whether the card can be unlocked at block 470. If not, the method ends. If so, at block 472, the card holder is asked to enter an administrative PIN to unlock the card. If the proffered PIN is incorrect, the card holder may be given additional tries at providing a PIN, until the PIN is correct or the method terminates. When the card holder does provide a correct administrative PIN, at block 476, the card is unlocked to accept the card holder's PIN and flow returns to block 410.

Other embodiments may contain additional procedures to renew a smart card or may omit some of the procedures illustrated in FIG. 4. In some embodiments, once the system determines that a smart card has expired, the card holder may be able to enter a recovery environment by entering a PIN or other secret data without extracting a replacement certificate from the smart card. The original, expired certificate may suffice. In other embodiments, the replacement certificate may have been stored on the smart card during generation. In a few embodiments, renewal may restore the original private/public cryptographic key pair and certificate under more restrictive conditions of use. In several embodiments, a renewal system may renew the smart card upon expiration and check its validity when it is used.

Figure 5:
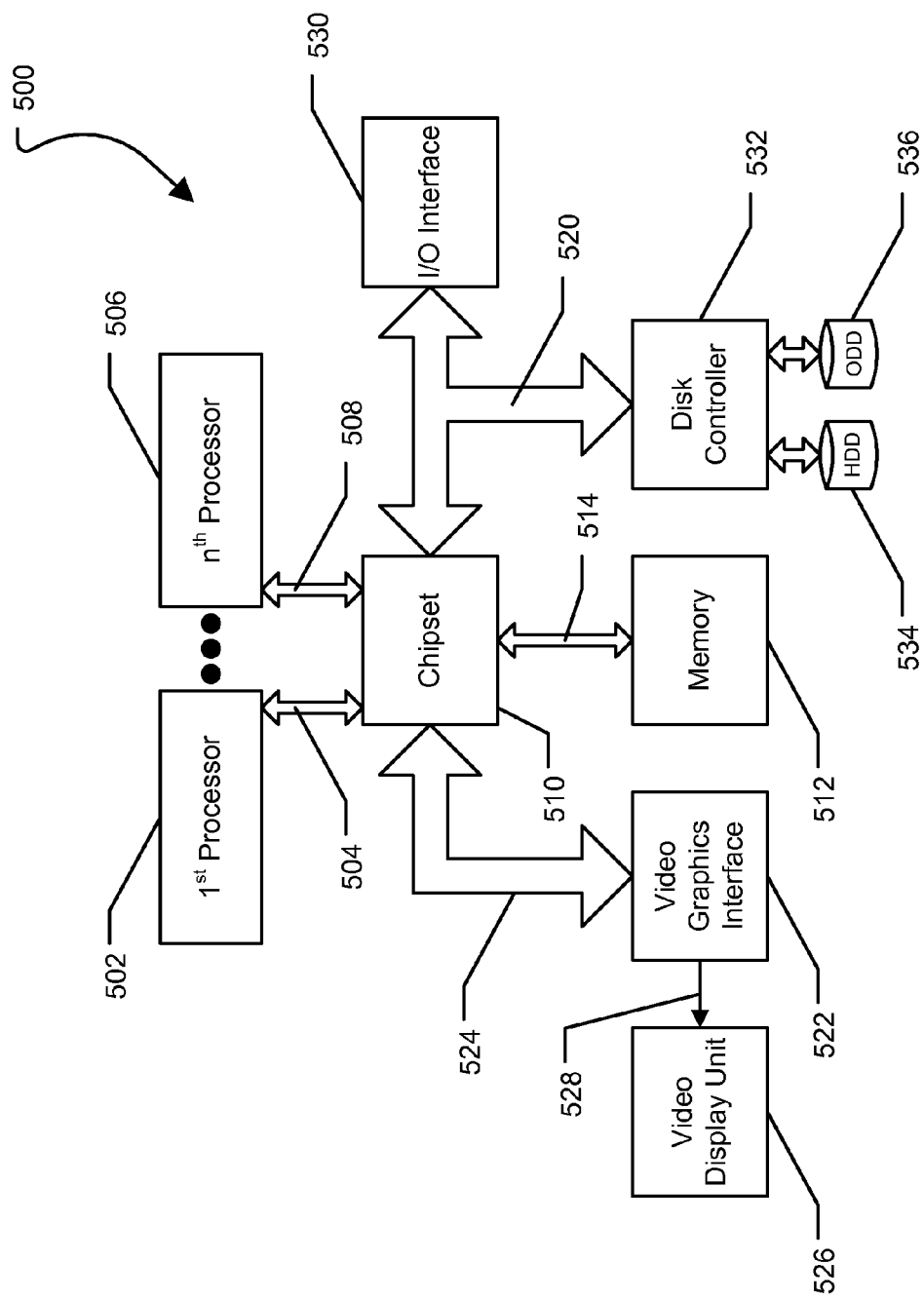
FIG. 5 illustrates a block diagram of an information handling system according to one embodiment of the disclosure.

FIG. 5 illustrates a block diagram of an exemplary embodiment of an information handling system, generally designated at 500. In one form, the information handling system 500 can include IT station 110, domain controller 120, or user station 130 of FIG. 1 or can carry out portions of the methods of FIGS. 2 and 3. The information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be a Peripheral Component Interconnect (PCI) Express interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a PCI bus or a high speed PCI-Express bus. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

The disk drive units 534 and 536 may include a computer-readable medium in which one or more sets of instructions such as software can be embedded. Further, the instructions may embody one or more of the methods or logic as described herein. In a particular embodiment, the instructions may reside completely, or at least partially, within memory 514 and/or within one or more of processors 502 and 506 during execution by the information handling system 500. Memory 514 and processors 502 and 506 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via a network interface device.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    storing a recovery certificate on a smart card during creation of the smart card;
    preventing access to the recovery certificate before expiration of a first certificate on the smart card; and
    generating a renewal certificate for the smart card after expiration of the first certificate, the generating including releasing the recovery certificate on the smart card after expiration of the first certificate.

2. The method of claim 1 wherein the recovery certificate and the renewal certificate are different certificates.

3. The method of claim 1, wherein a user of the smart card is required to provide a personal identification number (PIN) in order to release the recovery certificate.

4. The method of claim 1, wherein the generating comprises placing a user of the smart card into a certificate renewal environment, the certificate renewal environment limited to renewal of the smart card.

5. The method of claim 4, further comprising:
    before placing the user into the certificate renewal environment, checking whether the user is authorized for a renewal smart card; and
    placing the user into the certificate renewal environment based upon determining that the user is authorized for a renewal smart card.

6. The method of claim 4, further comprising:
    after placing the user into the certificate renewal environment, checking whether the user is authorized for a renewal smart card; and generating the replacement certificate based upon determining that the user is authorized for a renewal smart card.

7. The method of claim 1, wherein:
    the creating the smart card comprises creating the smart card at a location of an information technology (IT) department of an organization pursuant to a policy of the organization to create smart cards at an IT location; and
    the generating comprises generating the renewal certificate at a work location of a user of the smart card, the work location apart from any locations of the IT department.

8. The method of claim 1, wherein logging into an information handling system of an organization with the smart card containing the renewal certificate provides more limited access to the information handling system than holder logging into the information handling system with the smart card containing the first certificate.

9. The method of claim 8, wherein the smart card with the renewal certificate authorizes a user to perform fewer functions on the information handling system and provides more limited access to data than the smart card with the first certificate.

10. The method of claim 8, wherein a period between generation and expiration of the renewal certificate is shorter than a period between generation and expiration of the first certificate.

11. A method comprising:
    generating a smart card according to a first authorization process with a first period before expiration and a first set of authorizations based upon possession of the smart card; and
    after expiration of the smart card, renewing the smart card according to a second authorization process with a second period before expiration and a second set of authorizations based upon possession of the smart card, wherein the first period is longer than the second period, the first authorization process is more rigorous than the second authorization process, and the first set of authorizations conveys more functionality than the second set of authorizations.

12. The method of claim 11, wherein:
    the generating comprises inserting a certificate on the smart card, wherein the certificate is not to be released until expiration of the smart card; and
    the renewing comprises:
    requiring a user of the smart card to provide a personal identification number after expiration of the smart card;
    releasing the certificate based upon the expiration of the smart card and verification of the personal identification number; and
    renewing the smart card based upon the release of the certificate.

13. The method of claim 11, wherein the first authorization process occurs at a location of an information technology (IT) department of an organization and the second authorization process occurs at a work station of a user of the smart card.

14. The method of claim 11, wherein the first authorization process requires the presence of a member of the IT department at the location and the second authorization process does not require the presence of a member of the IT department at the work station.

15. The method of claim 11, wherein the first set of authorizations allows access to more data than the second set of authorizations.

16. The method of claim 11, wherein the first set of authorizations allows performance of more functions than the second set of authorizations.

17. A system comprising:
    a terminal with a smart card reader to issue a smart card and to store a first certificate and a recovery certificate in the memory of the smart card during creation of the smart card; and
    an information handling system to generate a renewal certificate for the smart card after expiration of the first certificate, the generation to include the release of the recovery certificate after expiration of the first certificate wherein the smart card is to prevent access to the recovery certificate before expiration of the first certificate on the smart card.

18. The system of claim 17, wherein the recovery certificate and the renewal certificate are different certificates.

19. The system of claim 17, wherein:
    the terminal is at a location of an information technology (IT) department of an organization pursuant to a policy of the organization to create smart cards at an IT location; and the information handling system is at a work location of a user of the smart card, the work location apart from any locations of the IT department.

20. The system of claim 17, wherein a login to the information handling system with the smart card containing the renewal certificate provides more limited access to the information handling system than a login with the smart card containing the first certificate.

* * * * *